US009311696B2

(12) United States Patent
Yang et al.

(10) Patent No.: US 9,311,696 B2
(45) Date of Patent: Apr. 12, 2016

(54) COLOR ENHANCEMENT FOR GRAPHIC IMAGES

(71) Applicant: Intel Corporation, Santa Clara, CA (US)

(72) Inventors: Shengqi Yang, Tempe, AZ (US); Tiehan Lu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/294,464

(22) Filed: Jun. 3, 2014

(65) Prior Publication Data

US 2014/0270521 A1 Sep. 18, 2014

Related U.S. Application Data

(62) Division of application No. 13/930,113, filed on Jun. 28, 2013, now abandoned, which is a division of application No. 12/215,815, filed on Jun. 30, 2008, now abandoned.

(51) Int. Cl.
*G06T 5/40* (2006.01)
*G06T 5/00* (2006.01)
*H04N 1/60* (2006.01)

(52) U.S. Cl.
CPC . *G06T 5/40* (2013.01); *G06T 5/007* (2013.01); *H04N 1/6027* (2013.01); *G06T 2207/10016* (2013.01); *G06T 2207/10024* (2013.01); *G06T 2207/20012* (2013.01); *G06T 2207/20182* (2013.01)

(58) Field of Classification Search
CPC ................. G09G 2360/16; G09G 2320/0242; G09G 2320/0666; G06T 5/40; G06T 5/007; G06T 2207/10016; G06T 2207/10004; G06T 2207/10024; G06T 2207/20224; G06T 2207/20012; G06T 5/50; H04N 1/6027; H04N 13/001
See application file for complete search history.

(56) References Cited

U.S. PATENT DOCUMENTS 6,711,289 B1 * 3/2004 Sakamoto ...................... 382/167
7,218,777 B2 5/2007 Asano
(Continued)

FOREIGN PATENT DOCUMENTS

CN ZL200910159427.5 10/2013

OTHER PUBLICATIONS

Ku et al., "Luminance-based adaptive color saturation adjustment"; Consumer Electronics, IEEE Transactions on vol. 51, Issue 3, Aug. 2005, pp. 939-946.

(Continued)

*Primary Examiner* — Jingge Wu
(74) *Attorney, Agent, or Firm* — Trop, Pruner & Hu, P.C.

(57) ABSTRACT

A color enhancement system may enhance color components in an image. In one embodiment, the color enhancement system suppresses banding by combining an input color value with an enhanced colored value. In another embodiment, local variation in saturation values around a pixel may be used to determine a modification of an input saturation value for color enhancement. As still another embodiment, flickering between frames may be suppressed by combining a histogram that counts the number of times a given pixel value occurs in a particular image with a historical histogram that keeps track of an average of how often given values have occurred in previous frames.

11 Claims, 2 Drawing Sheets

(56) References Cited

U.S. PATENT DOCUMENTS

| | | | |
|---|---|---|---|
| 7,359,548 | B2 | 4/2008 | Douglass |
| 7,376,453 | B1* | 5/2008 | Diab et al. .................... 600/336 |
| 7,529,405 | B2 | 5/2009 | Masuno |
| 7,760,942 | B2 | 7/2010 | Bushell |
| 7,965,426 | B2 | 6/2011 | Hori |
| 2001/0036311 | A1* | 11/2001 | Tomomatsu .................. 382/168 |
| 2003/0120365 | A1* | 6/2003 | Asano et al. .................... 700/86 |
| 2004/0120576 | A1* | 6/2004 | Kim ............................. 382/167 |
| 2004/0126010 | A1* | 7/2004 | Yamazoe ...................... 382/162 |
| 2006/0262353 | A1 | 11/2006 | Anbalagan |
| 2007/0262985 | A1* | 11/2007 | Watanabe et al. ............. 345/420 |
| 2008/0068510 | A1* | 3/2008 | Kanai ............................ 348/672 |
| 2009/0324071 | A1* | 12/2009 | Yang et al. .................... 382/167 |
| 2011/0279710 | A1* | 11/2011 | Lee ............................... 348/234 |
| 2013/0329998 | A1* | 12/2013 | Webb et al. ................... 382/167 |

OTHER PUBLICATIONS

Lee et al., "Automatic flesh tone reappearance for color enhancement in TV"; Consumer Electronics, IEEE Transactions on vol. 43, Issue 4, Nov. 1997, pp. 1153-1159.

Naccari et al., "Natural scenes classification for color enhancement", Consumer Electronics, IEEE Transactions on vol. 51, Issue 1, Feb. 2005, pp. 234-239.

Communication dated May 20, 2011 issued by the European Patent Office in Application No. 09251674.9 (5 pages).

Communication dated May 26, 2011 pursuant to Article 94(3) EPC issued by the European Patent Office in Application No. 09251674.9 including supplemental European Search Report (4 pages).

Photoshop Tutorials, "The Best Technique to Enhance Saturation" dated Feb. 29, 2008, from the Internet: www.tutorialpulse.com/54/the-best-technique-to-enhance-saturation (17 pages).

* cited by examiner

COLOR ENHANCEMENT FOR GRAPHIC IMAGES

CROSS-REFERENCE TO RELATED APPLICATION

This application is a divisional of U.S. patent application Ser. No. 13/930,113, filed on Jun. 28, 2013, which is a divisional of U.S. patent application Ser. No. 12/215,815 filed on Jun. 30, 2008, now abandoned.

BACKGROUND

This relates generally to image processing and to techniques for improving the quality of images displayed in computed-based systems.

One of the tasks of the video post-processing pipeline is automatic color enhancement. In the hue, saturation, luminance (HSL) color space there are two different aspects that can be changed for color enhancement, hue adjustment and saturation adjustment. A typical hue adjustment example is the facial tone correction by moving the phase of the chrominance signal closer to the phase of the corresponding facial tones. While phase errors in the facial tone are reduced, the phase errors for other color components may be increased.

Color saturation may also be important because saturated colors are more appealing to the user's eye. To obtain a more vivid image, the basic approach of adjusting saturation of an image is by increasing the gain of the chrominance vector of the image. This operation is equivalent to multiplying the original chrominance vector by a saturation vector. Traditionally, color enhancers normally use a preset and fixed saturation factor, regardless of the input image characteristics. For less saturated video images, vivid effects can be obtained by applying a fixed saturation factor. However, for already saturated video images, over-saturation and loss of image details may result from over-saturation adjustment.

In addition, color banding may occur when directly increasing color saturation. Color banding occurs when a display is unable to render smooth color gradients and, instead, presents stripes or bands of colors, especially in very light or very dark areas.

DETAILED DESCRIPTION

Figure 1:
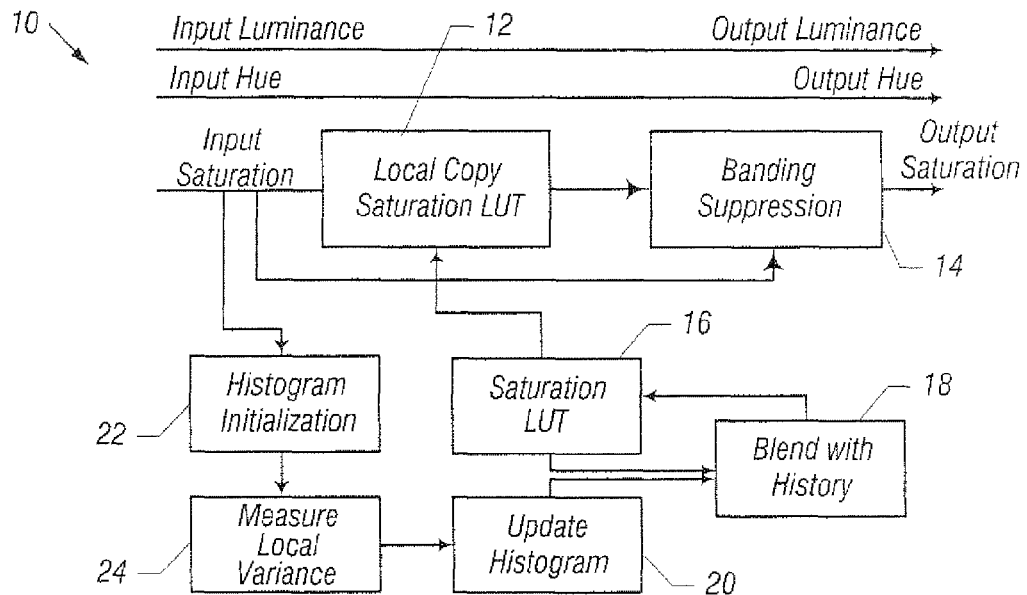
FIG. 1 is a schematic depiction of one embodiment of the present invention.

Referring to FIG. 1, a color enhancement system 10 may operate only on saturation in a hue, luminance, saturation (HSL) color space. The value for input luminance and input hue may be unaffected by the system 10. Instead, only the input saturation may be modified in some embodiments. In some embodiments, the saturation enhancement is similar to a contrast enhancement.

Initially, a histogram is initialized. The histogram may be initialized by applying the same numbers to all entries within the histogram. In some embodiments, where the possible saturation values are from 0 to 255, each value may be given an initial entry of, for example, 500. In some embodiments, instead of using all 256 values, only 64 values are used, so that the saturation values are grouped. For example, saturation values 0 to 3, 4 to 7, etc. may be separate groups. The histogram basically keeps track of how many times a given value from 0 to 255 is encountered within the pixels in the input image. Thus, after initializing the histogram in block 22, the local variance is measured in block 24.

To measure the local variance, for each pixel, the saturation similarity between the central pixel and its neighbors is measured. For example, in one embodiment, the central pixel can be compared to four neighbors or eight neighbors, as desired. To do the comparison, the saturation values of the central pixel is compared to the average of the saturation values of its neighbors. As an example, the sum of absolute difference between the saturation values of the central pixel and its surrounding pixels may be determined. If the sum is higher than a predefined threshold, for example 50, the central pixel can be treated as a pixel coming from a non-uniform region, in terms of color saturation. Accordingly, the entry in the histogram, which corresponds to this pixel value, may be increased, for example, by one. If the sum is lower than the threshold, then, most probably, the pixel comes from a region of uniform saturation. In this case, in one embodiment, the value of the entry corresponding to this pixel's saturation is not changed.

After scanning the whole image, pixel by pixel, a histogram records the counts of each potential saturation value, for example, from 0 to 255. The histogram indicates how many pixels in the image have a particular saturation value. However, the histogram is slightly skewed because the values of pixels with local color variation are actually increased. The resulting histogram, indicated in block 20, is then combined with a history histogram maintained in a history saturation lookup table (LUT) 16. By blending, at block 18, the updated histogram (block 20) with the historical histogram (block 16), the size of the saturation change may be reduced and flickering effects between neighboring frames may be reduced in some embodiments.

In one embodiment, a weighted average of the new histogram (block 20) and the historical histogram (block 16) may be used for blending. For example, in one embodiment, the current histogram is weighted as $7/16$ and the historical histogram is weighted as $9/16$. The new histogram may then be stored back in the historical saturation lookup table 16. In one embodiment, the blending of the historical and current histograms may be done by alpha blending using a weighted average. The exact value of the weights or the use of weights is subject to considerable variation.

Then, the new histogram that is blended from the new data and the historical data is stored as the new lookup table 16 and then is used to adjust the input saturation in the local copy saturation lookup table 12. The lookup table 12 may store a local copy of the historical saturation lookup table stored at 16. In addition, the local copy may be transformed to provide a value for every possible saturation level from 255. Thus, while the saturation lookup table 16 may only have a value for each group of saturation values, say from 0 to 3 and 4 to 7 and so on, interpolation may be used to develop histogram values for each of 0 to 255 possible values in one embodiment.

Using the lookup table (block 12), the input saturation values are adjusted. Histogram equalization is performed for the input image based on the updated local histogram.

In some embodiments, the output of local copy saturation lookup table 12 can then be used as the output saturation value. However, it is also advantageous for banding suppression to modify the local copy saturation lookup table 12 output values by blending the new value with the input saturation value in the banding suppression block 14. In some embodiments, a weighted average of the input saturation values and the values from the local copy saturation lookup table 12 may be used in block 14. As a result, color banding may be suppressed in some embodiments.

As a result, in some embodiments, saturation is made more even, the saturation contrast may be improved, and the difference between a pixel and its neighbors may be increased in some cases.

Figure 2:
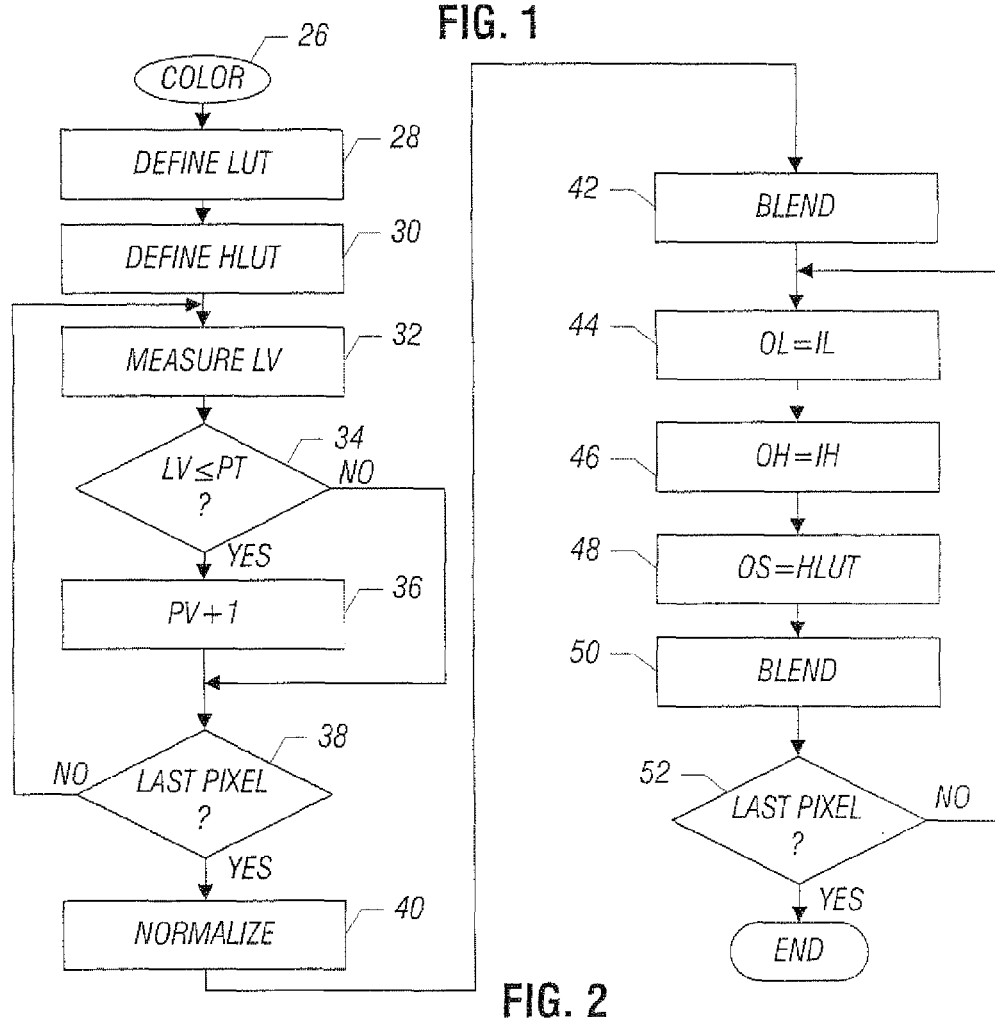
FIG. 2 is a flow chart for the embodiment shown in FIG. 1.

A flow chart, in FIG. 2, shows one sequence 26 for implementing the functions depicted in FIG. 1. In some embodiments, the color enhancement system 10 may be implemented in software using a storage device to store computer readable instructions which, when executed, cause the functions depicted in FIG. 1 to be accomplished. In other embodiments, hardware may be used for this purpose.

Initially, the local copy saturation lookup table 12 is initialized and defined, as indicated in block 28. In addition, the saturation lookup table 16 that stores the historical histogram may be defined and initialized at block 30. Then, for each pixel in the image, the local variation is measured, as indicated in block 32. If the local variation is less than or equal to a predefined threshold PT, as determined in diamond 34, the pixel value PV is increased by one, as indicated in block 36. The flow iterates until the last pixel in the image has been processed, as indicated in diamond 38.

At this time, the information may be normalized to provide 256 interpolated values from a smaller number of values, such as 64, as described above, as indicated in block 40. Then, the new histogram is blended with the historical histogram, as indicated in block 42. The output luminance is set equal to the input luminance in block 44. The output hue is set equal to the input hue in block 46. In block 48, the output saturation is set equal to the historical lookup table value stored in the local copy saturation lookup table 12. Then, in block 50, the local copy saturation lookup table value and the input saturation value are blended. When the last pixel is completed, as determined in diamond 52, the flow ends.

Figure 3:
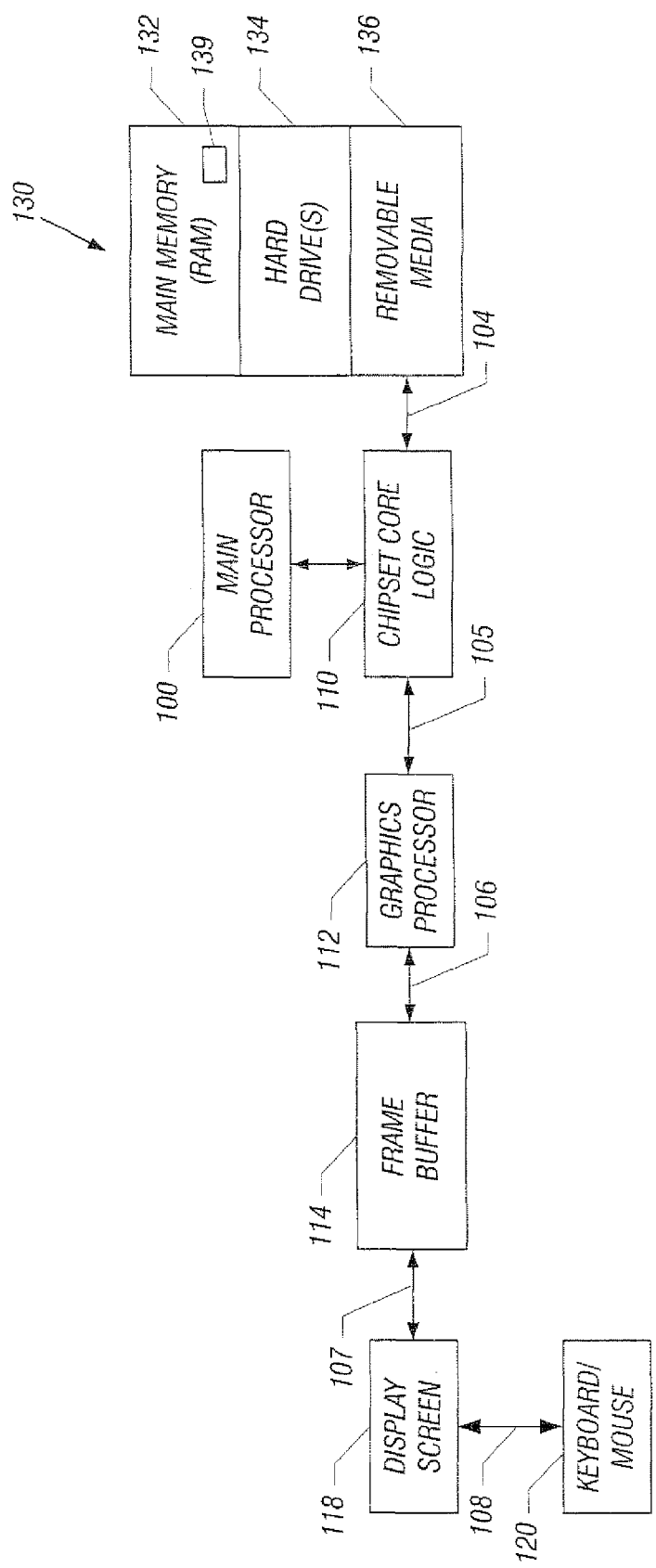
FIG. 3 is a system depiction for one embodiment.

Turning next to FIG. 3, a graphics processor 112 may include a video post-processing pipeline that accomplishes the functional blocks of FIG. 1 in one embodiment. The graphics processor 112 may be coupled to a frame buffer 114 by a bus 106. The frame buffer 114 may be coupled to a display screen 118 to display the images produced by the graphics processor 112. Buses 107 and 108 are coupled to the display screen 118 which is also coupled to a keyboard or mouse 120.

The graphics processor 112 is coupled by a bus 105, in one embodiment, to a chipset core logic 110 that couples the main processor 100 and storage 130 by a bus 104. The storage 130 may include a main memory 132, hard drives 134, and removable optical or magnetic media 136 in some embodiments. In some embodiments, the sequence 26 depicted in FIG. 2 may be implemented in software and may be stored in the region 139 of the main memory 132. However, the present invention is not limited to software embodiments. The main memory 132 may also store the various lookup tables indicated in FIG. 1, in some embodiments. Of course the storage may be in any other storage device or within components such as the main processor 100 or graphics processor 112 in some embodiments.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of adjusting saturation of an image comprising:
   adjusting the saturation of an image based on the variation in saturation values between pixels in the image and the neighbors of those pixels in the same image;
   determining a sum of absolute differences between a central pixel and its neighbors;
   using a histogram to keep track of the number of occurrences of saturation values of pixels within an image;
   changing the number of occurrences of saturation values based on the local variation between a given pixel and its neighbors by increasing the number of occurrences of saturation values if the sum of absolute differences is higher than a threshold; and
   if the sum of absolute differences is lower than the threshold, then making no change to the number of occurrences.

2. The method of claim 1 including blending a historical histogram taken over previous images and a histogram containing the changed number of occurrences of saturation values.

3. The method of claim 2 including using a weighted average of the historical histogram and the histogram containing the changed number of occurrences of saturation values to form a blended histogram.

4. The method of claim 3 including using the blended histogram to modify the saturation values of input pixels.

5. One or more non-transitory computer readable media storing instructions executed by a processor to perform a sequence comprising:
   adjusting the saturation of an image based on the variation in saturation values between pixels in the image and the neighbors of those pixels in the same image;
   determining a sum of absolute differences between a central pixel and its neighbors;
   using a histogram to keep track of the number of occurrences of saturation values of pixels within an image;
   changing the number of occurrences of saturation values based on the local variation between a given pixel and its neighbors by increasing the number of occurrences of saturation values if the sum of absolute differences is higher than the threshold; and
   if the sum of absolute differences is lower than the threshold, then making no change to the number of occurrences.

6. The media of claim 5 including blending a historical histogram taken over previous images and a histogram containing the changed number of occurrences of saturation values.

7. The media of claim 6 including using a weighted average of the historical histogram and the histogram containing the changed number of occurrences of saturation values to form a blended histogram.

8. The media of claim 7 including using the blended histogram to modify the saturation values of input pixels.

9. A processing apparatus comprising:
   a hardware unit to adjust the saturation of an image based on the variation and saturation values between pixels in the image and the neighbors of those pixels in the same image, determine a sum of absolute differences between a central pixel and its neighbors, use a histogram to keep track of the number of occurrences of saturation values of pixels within an image, change the number of occurrences of saturation values based on the local variation between a given pixel and its neighbors, by increasing the number of occurrences of saturation values if the sum of absolute differences is higher than the threshold, and if the sum of absolute differences is lower than the threshold, then making no change to the number of occurrences; and
   a storage coupled to said unit.

10. The apparatus of claim 9, said unit to use a weighted average of the historical histogram and the histogram containing the changed number of occurrences of saturation values to form a blended histogram.

11. The apparatus of claim 10, said unit to use the blended histogram to modify the saturation values of input pixels.

* * * * *